(12) United States Patent
Chakravarty et al.

(10) Patent No.: US 6,747,577 B2
(45) Date of Patent: Jun. 8, 2004

(54) METHODS AND SYSTEMS FOR AIR VEHICLE TELEMETRY (75) Inventors: Abhijit J. M. Chakravarty, Renton, WA (US); James P. Hamley, Mill Creek, WA (US); Joseph M. Romanosky, Auburn, WA (US)

(73) Assignee: The Boeing Company, Seattle, WA (US)

( * ) Notice: Subject to any disclaimer, the term of this patent is extended or adjusted under 35 U.S.C. 154(b) by 114 days.

(21) Appl. No.: 09/994,259

(22) Filed: Nov. 26, 2001

(65) Prior Publication Data

US 2003/0098773 A1 May 29, 2003

(51) Int. Cl.$^7$ ............................................... G08B 21/00
(52) U.S. Cl. ......................... 340/945; 455/430; 370/347
(58) Field of Search ........................ 340/945; 701/214; 455/430, 431; 370/337, 347, 316

(56) References Cited

U.S. PATENT DOCUMENTS

| | | | |
|---|---|---|---|
| 4,879,643 A | | 11/1989 | Chakravarty et al. |
| 5,072,893 A | | 12/1991 | Chakravarty et al. |
| 5,161,158 A | | 11/1992 | Chakravarty et al. |
| 5,457,634 A | | 10/1995 | Chakravarty |
| 5,884,181 A | * | 3/1999 | Arnold et al. ............... 455/450 |
| 5,890,079 A | | 3/1999 | Levine |
| 6,018,659 A | * | 1/2000 | Ayyagari et al. ............ 455/431 |
| 6,108,539 A | * | 8/2000 | Ray et al. .................... 455/430 |
| 6,115,371 A | * | 9/2000 | Berstis et al. ................ 370/345 |
| 6,426,959 B1 | * | 7/2002 | Jacobson et al. ............ 370/468 |
| 6,511,020 B2 | * | 1/2003 | Higgins ................... 244/158 R |
| 6,529,706 B1 | * | 3/2003 | Mitchell ..................... 455/12.1 |
| 6,591,084 B1 | * | 7/2003 | Chuprun et al. ........... 455/3.05 |

OTHER PUBLICATIONS

R. W. Excell; *SITA VHF and Satellite Aircom Air / Ground Communication Services;* pp. 617–627, 636–637,642–645; SITA (Société Internationalé De Telecommunications Aeronautiques).

Michael Verhufen, Michael Schwenke; *Airbus A330/A340 Expanded Interface Capabilities to Support Today's Data Communication Environment; Proceedings of the 17$^{th}$ Symposium "Aircraft Integrated Monitoring Systems";* Sep. 21–23, 1993; pp. 6–9, 563–577,592–593, 596–607, 638–641; DLR–Mitt. 94–01; Helmut Hardegen (Scientific Coordinator); DLR Institut für Flugführung Braunschweig; Bonn, Germany.

* cited by examiner

Primary Examiner—John Tweel
(74) Attorney, Agent, or Firm—Alston & Bird LLP (57) ABSTRACT Methods and systems are provided in which the most important communications that occur onboard the air vehicle and between the air vehicle and other locations continually have sufficient communication bandwidth and are not impeded by less important communications to ensure that the flight crew and flight control personnel on the ground have the most complete and accurate information. Other aspects of the method and system further assist in maintaining a safe flight by permitting the air vehicle to be both flown and landed while in an auto-pilot mode engaged in the air vehicle or from the ground and disengaged from the ground or by entering a code in the air vehicle, displaying target settings of respective parameters provided by the ground control center, providing detailed flight data to the air vehicle from the ground control center, and examining data in the ground control center captured onboard the air vehicle to identify individuals that may pose a security risk.

13 Claims, 4 Drawing Sheets

| Flight Data Recorder 74 | Satellite Signal Processing 70 |
| Engine Performance 76 | |
| System Performance 78 | |
| Navigation Data 80 | Over Ground Signal Processing 72 |
| Communication 82 | |
| Flight Control 84 | |
| Audio and Video Data 86 | |

METHODS AND SYSTEMS FOR AIR VEHICLE TELEMETRY

FIELD OF THE INVENTION

This invention relates to communications onboard an air vehicle and between an air vehicle and a ground control center such that the communications are controlled to ensure, among other things, that high priority communications that support the flight operations continually have sufficient communication bandwidth for transmission and reception by the air vehicle.

BACKGROUND OF THE INVENTION

While an air vehicle is in operation, various types of communications occur onboard the air vehicle and between the air vehicle and other locations. The communications include the transmission and reception of voice and data communications. For example, the flight crew may communicate with flight control personnel on the ground, the flight crew may communicate with the passengers via a public-address (PA) system, and the passengers may communicate via telephones or other electronics. Additionally, data such as updated weather information, entertainment programs and the like are oftentimes received by the air vehicle.

An air vehicle typically has a finite communication bandwidth that may be utilized to support all of the communications that occur onboard the air vehicle and between the air vehicle and other locations. The conventional process of supporting all of the air vehicle communications within the communication bandwidth involves allowing any type of voice or data communications to use a portion of the bandwidth if it is available, much like a first come, first serve basis. Until recently, the communication bandwidth for an air vehicle has been sufficient to support most, if not all, of the air vehicle communications without having different types of communications contending for the same portion of the bandwidth.

The quantity of voice and data communications that is desired to be transmitted between the air vehicle and the ground control center is increasing rapidly. For example, the computers onboard an air vehicle generate substantial amounts of data, at least some of which is desirably transmitted to the ground control center for review and analysis. Conversely, a ground control center oftentimes has access to large amounts of data that might be useful to the flight crew. In addition, passengers are carrying on more portable electronic devices, many of which also compete for a portion of the communications bandwidth. As such, the communications bandwidth may be quickly depleted, thereby preventing or at least delaying at least some communication.

Another example of increased communications between the air vehicle and the ground control center is illustrated in that, in the past, the ground control center only had the ability to transmit basic flight advisories to flight crew in the air vehicle, which merely provided an alert or warning to the flight crew. In addition, air vehicles only have had the ability to transmit basic flight data to ground control centers, leaving the detailed flight data to be recorded along with cockpit voices and instrumentation readings in the air vehicle's flight data recorder, and cockpit voice recorder, also known as the "black boxes."

As described above, the quantity of air vehicle communications has increased and is anticipated to increase even more rapidly in the future. It is therefore possible that future air vehicle communications may exceed the existing communication bandwidth of the air vehicle. For instance, if a number of passengers are using onboard telephones or other electronic devices during the flight of the air vehicle, the passenger communications may occupy a significant amount of the available bandwidth. Thus, if the flight crew needs to transmit flight information to or receive flight information from the ground control center, there may not be enough communication bandwidth available to support the transfer of the flight information. Thus, the flight crew may not obtain or at least experience a delay in obtaining valuable flight information.

Therefore, a need in the industry exists to support increased communications onboard an air vehicle and between an air vehicle and other locations. In supporting the increased demand for the communications bandwidth, there is a need to insure that the most important communications that occur onboard the air vehicle and between the air vehicle and other locations continually have sufficient communication bandwidth such that they are not blocked or delayed by the monopolization of the communications bandwidth by other, less important types of communications. In particular, there is a need to ensure that the flight crew has the most complete and accurate information possible in order to permit them to make well-informed decisions that result in a safe and more efficient flight.

SUMMARY OF THE INVENTION

In this regard, the method and system of one embodiment monitor the communications onboard the air vehicle and between the air vehicle and the ground control center to insure that those types of communications that are considered the most important will always be supported and will not be blocked or delayed as a result of a monopolization of the communications bandwidth by other types of communication of lesser importance. Other aspects of the method and system of the present invention further assist in the safe flight of the air vehicle by permitting the air vehicle to be flown and landed while in an auto-pilot mode without further manual input, by displaying target settings of respective parameters provided by the ground control center, by providing detailed flight data to the air vehicle from the ground control center and by examining audio and/or video data in the ground control center that was captured onboard the air vehicle to identify individuals that may pose a security risk while the air vehicle is in flight.

In one advantageous embodiment of the present invention, a method and system are provided for selectively allocating the communication bandwidth supported by an air vehicle. In this regard, the air vehicle includes a communication system for transmitting and receiving different types of communication signals. In addition, a priority hierarchy is provided for the different types of communication signals based on the relative importance of the signals. The priority hierarchy may involve assigning a higher priority to communications between a ground control center and the air vehicle and assigning a lower priority to passenger communications. Additionally, the priority hierarchy of this embodiment may be stored in the data management controller of the air vehicle.

The air vehicle of this embodiment also includes a processing element. According to the system and method of this embodiment, the processing element is responsive to the priority hierarchy and monitors the communication signals transmitted to and from the air vehicle via the communication system. The processing element then dedicates portions of the communication bandwidth to predefined types of the communication signals based on the priority hierarchy. When dedicating the portions of the communication bandwidth, the portion of the communication bandwidth available to lower priority communication signals may be limited if higher priority communication signals are to be transmitted. In addition, the portion of the communication bandwidth dedicated to predefined types of communication signals may be reallocated as different types of signals are to be transmitted. To determine whether to dedicate a portion of communications bandwidth to a certain communication signal, the processing element may read a header associated with the communication signal to determine the type of the signal, and may then determine the relative importance of this type of communication signal based upon the priority hierarchy. To permit ongoing communications between the air vehicle and the ground control center, even if the communication bandwidth is otherwise occupied, a portion of the communication bandwidth may be permanently dedicated to communications between the air vehicle and the ground control center, thereby serving as a command and control channel.

The system and method of this embodiment of the present invention advantageously ensure high priority communication signals, such as communications transmitted between the air vehicle and a ground control center, sufficient communication bandwidth such that the high priority communication signals are not blocked or delayed by lower priority communication signals, such as passenger phone calls. The safety of the overall flight of the air vehicle is therefore preserved even as the competition for the communications bandwidth increases because the higher priority communication signals continually have sufficient bandwidth to be transmitted to and from the air vehicle, resulting in the flight personnel in the air and on the ground having sufficient data to consistently make well-informed decisions.

According to another embodiment of the present invention, a method is provided for engaging the auto-pilot mode of an air vehicle from a ground control center. The auto-pilot mode is engaged from a ground control center by establishing communication between the air vehicle and the ground control center, transmitting the auto-pilot instructions to the air vehicle from the ground control center, and engaging the auto-pilot mode in response to the instructions from the ground control center. The auto-pilot mode may be irrevocably engaged for the duration of the flight, if desired.

Once the auto-pilot mode is engaged, the air vehicle may be flown based on pre-stored flight instructions. Alternatively, further instructions from the ground control center may control the flight of the air vehicle following engagement of the auto-pilot mode. The air vehicle may be both flown and landed in the auto-pilot mode, which may include automatically extending the flaps and slats of the air vehicle and automatically extending the landing gear of the air vehicle. Furthermore, a display of the status of the auto-pilot mode may be located onboard the air vehicle. The display may be imposed upon a display otherwise dedicated to depicting other flight information. Permitting the auto-pilot mode of an air vehicle to be engaged from the ground control center provides, among other things, a safety mechanism to insure the continued safe flight and landing of the air vehicle. As such, the auto-pilot communications between the ground control center and the air vehicle are examples of high priority communication signals that maintain the safety of the flight and landing, and will generally be accorded a high priority in the priority hierarchy.

According to another embodiment of the present invention, an improved method is provided for engaging the auto-pilot mode in an air vehicle by issuing an instruction from onboard the air vehicle. Once engaged, the auto-pilot mode of this embodiment can fly and thereafter land the air vehicle without requiring further input from any person onboard the air vehicle. In order to permit the air vehicle to be flown and thereafter landed without further manual intervention, the flaps and slats of the air vehicle may be automatically extended and the landing gear of the air vehicle may be automatically extended. The auto-pilot mode may be irrevocably engaged for the duration of the flight. Alternatively, the auto-pilot mode may be disengaged by providing a code to permit manual control of the air vehicle to resume. As before, the status of the auto-pilot mode may be depicted on a display located onboard the air vehicle, such as by being imposed upon a display otherwise dedicated to depicting other flight information. Engaging the auto-pilot mode in an air vehicle by issuing an instruction from onboard the air vehicle and thereafter flying and landing the air vehicle without further input from any person onboard the air vehicle also insures the continued safe flight and landing of the air vehicle.

A further embodiment of the present invention provides an improved method and system for displaying at least one target setting of a respective parameter upon a corresponding instrument display of an air vehicle. In this embodiment, a ground control center transmits at least one target setting for the respective parameter to a display controller, which is onboard the air vehicle. The display controller then instructs the instrument display to display the target setting along with the current setting of the respective parameter.

The ground control center may monitor the flight of the air vehicle by monitoring external parameters, instrument settings and the performance of the air vehicle. Based upon the monitoring of the flight of the air vehicle, the ground control center may generate at least one target setting for a respective parameter based at least in part upon the performance and flight of the air vehicle, and then transmit the target setting(s) to the air vehicle, such as via satellite communication. The method and system of this embodiment of the present invention also insures that the flight to the air vehicle is safe and efficient by enabling the flight crew to adjust its flight pattern to meet target settings for certain parameters that will result in better flight performance. Thus, the communications between the air vehicle and the ground control center that establish the target settings are further examples of the types of high priority signals for which bandwidth should continually be available.

According to another embodiment, an improved system and method for providing detailed flight data to an air vehicle are provided. The detailed flight data is provided by a ground control center that communicates with a data management controller of the air vehicle. The ground control center typically includes a processing element to monitor the flight of the air vehicle and a transmitter to transmit additional flight data from the ground control center to the air vehicle, wherein corresponding flight data has generally been stored in a memory device. The additional flight data is in at least the same level of detail as the corresponding data stored onboard the air vehicle to at least supplement the data stored onboard the air vehicle. The data management controller drives at least one display onboard the air vehicle based upon data stored onboard the air vehicle. The data management controller typically drives the display by altering the display based upon the additional flight data provided from the ground control center. In this regard, the additional flight data provided from the ground control center may be imposed upon a display otherwise dedicated to depicting other flight information. The additional flight data transmitted and displayed may include terrain data, a modified flight path that may be based upon a simulation conducted at the ground control center, and/or weather data from the ground control center.

The system and method of this embodiment is beneficial because it provides the flight crew with detailed information that they otherwise would not have, which assists the flight crew in making well-informed decisions regarding the flight. As such, flight safety is maintained or improved due to the additional, detailed information transmitted between the air vehicle and the ground control center. Therefore, these signals are also examples of high priority signals for which bandwidth should continually be available.

An improved method and system for monitoring an air vehicle, such as for safety reasons, are also provided. The air vehicle is monitored by at least one sensor that records audio and/or video data from within the air vehicle. A transmitter then transmits the data from the air vehicle to the ground control center. A processing element in the ground control center examines the data by comparing the data to a security database to identify individuals of interest, such as individuals that may pose a security risk, while the air vehicle is in flight. While the ground control center may include the security database, the processing element also may link the ground control center to an external security database.

If an individual of interest is identified by the processing element in the ground control center, a transmitter in the ground control center may transmit security procedures to the air vehicle. The security procedures then may be depicted on a display onboard the air vehicle, such as by being imposed upon a display that is otherwise dedicated to depicting other flight information. The method and system of this embodiment of the present invention also provide for increased safety features onboard the air vehicle and the signals between the air vehicle and the ground control center are other examples of high priority signals for which bandwidth should continually be available.

Thus, the system and method of the present invention provide a technique in which the most important communications that occur onboard the air vehicle and between the air vehicle and other locations will continually have sufficient communication bandwidth such that they are not blocked or delayed by less important communications, even as the demand for the communications bandwidth increases. The system and method of the present invention therefore ensure that the flight crew on an air vehicle and the flight control personnel on the ground have the most complete and accurate information available, such that the people in control of the flight can make well-informed decisions that maintain or improve the safety and efficiency of the flight.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
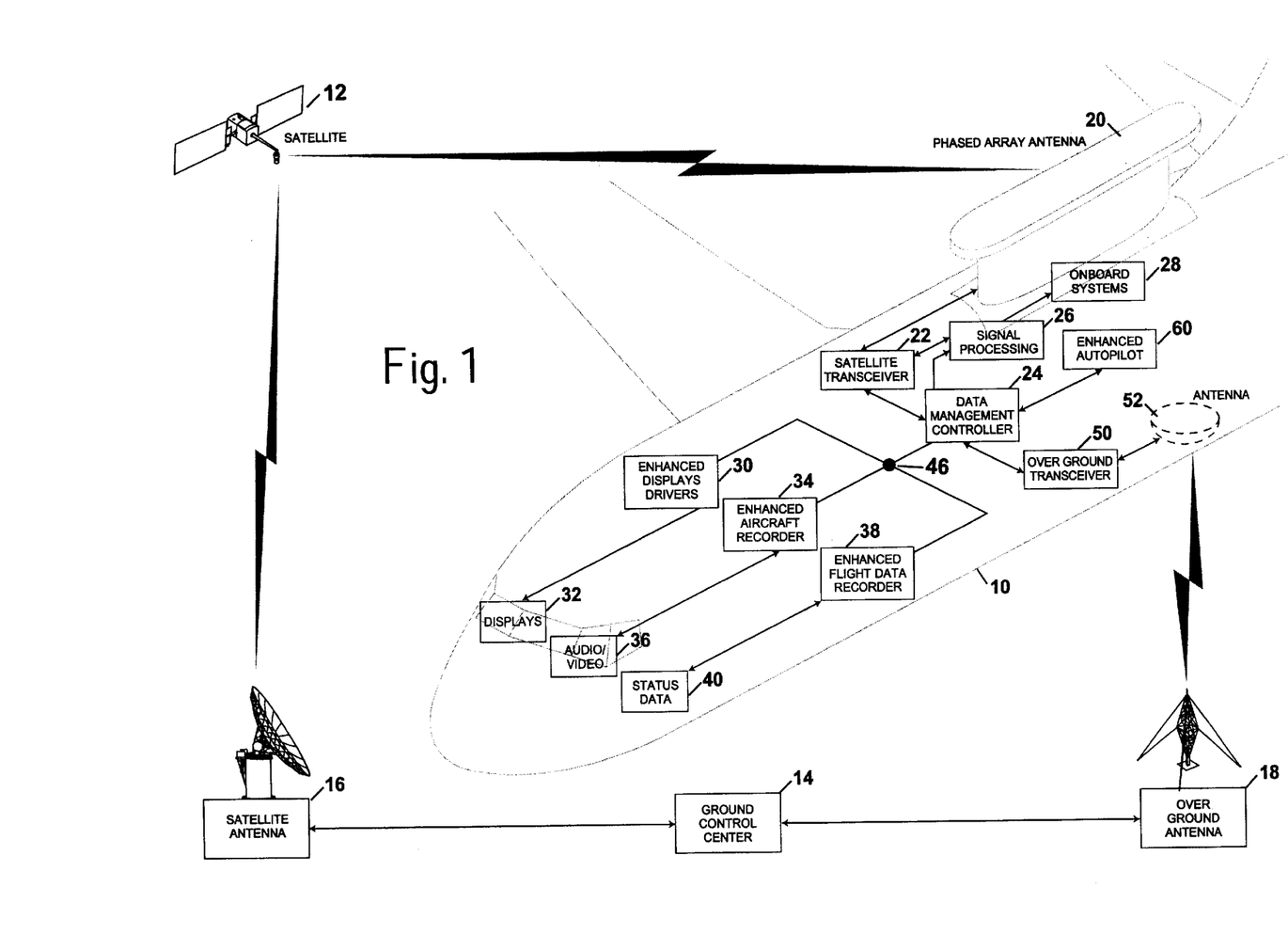
FIG. 1 is a schematic block diagram illustrating the methods and systems of the present invention according to one embodiment.

FIG. 1 illustrates an air vehicle 10 that is in communication with a ground control center 14. While the air vehicle is typically an airplane, the method and system of the present invention is also applicable to other types of air vehicles. Transmissions between the air vehicle 10 and the ground control center 14 take place via satellite and/or over ground communications depending upon the location of the air vehicle with respect to the overground antennas as known to those skilled in the art. To communicate via a satellite, signals to and from the air vehicle 10 are routed through a satellite transceiver 22 of the air vehicle 10. The satellite transceiver 22 is in communication with a phased array antenna 20, which is generally mounted on the upper surface of the aircraft 10. The phased array antenna 20 is electronically steerable to transmit signals to and receive signals from a respective communication satellite 12. The communication satellite 12 is capable of transmitting signals to and in receiving signals from a satellite antenna 16 located on the ground. The satellite antenna 16, in turn, transmits signals to and receives signals from the ground control center 14. Besides routing signals between the data management controller 24 and the phased array antenna 20, the satellite transceiver 22 may also transmit signals, such as passenger in-flight entertainment signals, to various onboard systems 28, such as the video monitors and cabin audio system. As shown in FIG. 1, these signals may be processed, such as by a signal processor 26 or the like, in order to properly format the signals prior to presentation to the onboard systems.

In addition to, or as an alternative to, satellite communication, the air vehicle 10 and the ground control center 14 may communicate via over ground communication if the air vehicle is within range of an over ground antenna 18. As such, the air vehicle 10 also has an over ground transceiver 50 to transmit signals to and receive signals from the data management controller 24 of the air vehicle 10. The over ground transceiver 50 also transmits signals to and receives signals from an over ground antenna 52 that is carried by the air vehicle 10. The over ground antenna 52 then transmits signals to and receives signals from an over ground antenna 18, which, in turn, communicates with the ground control center 14.

Figure 2:
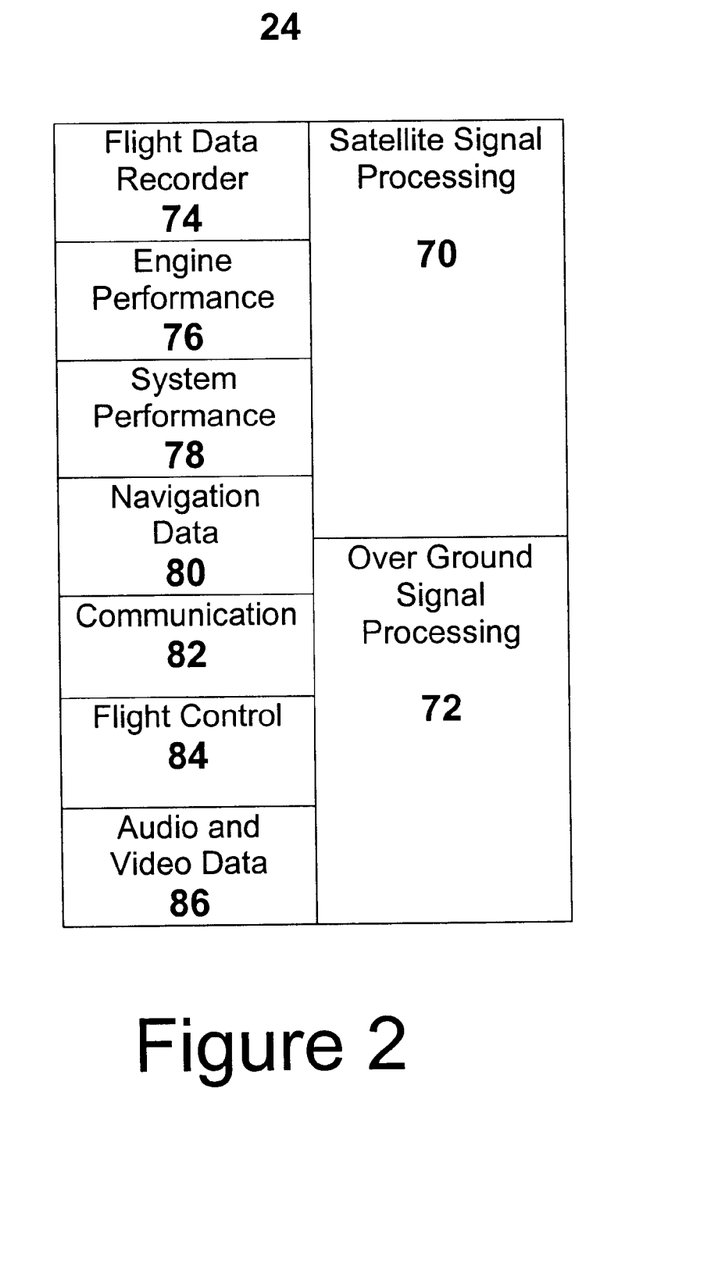
FIG. 2 is a block diagram of a data management controller that serves to at least partially implement the method and system of the present invention according to one embodiment.

As shown in FIG. 1, the data management controller 24 provides data to the satellite transceiver 22 and/or the over ground transceiver 50 to be transmitted to the ground control center 14 and receives data from the ground control center via the satellite transceiver and/or the over ground transceiver. The data management controller 24 performs many additional functions as shown in FIG. 2. In this regard, FIG. 2 illustrates a typical data management controller 24 that contains satellite signal processing components 70 and over ground signal processing components 72 for communicating with the satellite transceiver 22 and the over ground transceiver 50, respectively. The data management controller is also generally capable of receiving flight data from a variety of sources onboard the air vehicle and for directing the data to an enhanced flight data recorder 38 as indicated by block 74. Likewise, the data management controller commonly receives audio data recorded in the cockpit and/or video data recorded in the cabin, cockpit and/or cargo hold and directs the audio data to a cockpit voice recorder and the video data to a video data recorder as collectively represented by block 86 in FIG. 2 and block 34 in FIG. 1. As indicated by blocks 76, 78 and 80, and as known to those skilled in the art, the data management controller also receives engine data, system data and navigation or flight data, respectively, which are provided to the flight management computer and various other systems, such as the Engine Instrument Crew Alert System (EICAS) as known to those skilled in the art. The data management system can also receive and process various flight control signals as indicated by block 84. For example, the flight control signals may be provided by a pitch control system, a roll control system, a yaw control system and/or a flap/slat electronic unit. The flight control signals can also include propulsion control signals provided by a thrust management computer or the like. Based upon at least some of the new flight control signals, the data management controller 24 can drive a plurality of displays 32, typically via display drivers 30, as described below. As described below, the flight control signals may include other signals utilized during the auto-pilot mode. Finally, the data management controller 24 can receive, process and distribute in-flight entertainment signals as indicated.

As described, the data management controller 24 receives and transmits many types of communication signals via the phased array antenna 20 and/or the over ground antenna 52. Regardless of the type of signals, however, all of the signals must generally be transmitted within a fixed communication bandwidth. The types of signals range from signals that relate to flight safety, which have a high priority, to signals relating to passenger entertainment, which have a lower priority. According to one aspect of the present invention, the air vehicle includes a processing element, typically embodied by the data management controller 24, for appropriately allocating the communications bandwidth, if necessary, among the various types of signals. As such, the data management controller may monitor the types of communication signals transmitted to and from the air vehicle 10 and may identify those instances in which the demand for communications exceeds the communications bandwidth. In these situations, the data management controller preferably reallocates utilization of the communications bandwidth such that those communication signals having a higher priority are allocated a portion of the communications bandwidth while the transmission of communications signals having a lower priority are delayed or otherwise blocked. Typically, the relative priority of the different types of communication signals is defined by a priority hierarchy, that may be stored by the data management controller.

Although bandwidth allocation may be accomplished in various manners, bandwidth allocation of priority signals may be accomplished in one advantageous embodiment as follows. Both the data management controller 24 in the air vehicle 10 and the ground control center controller 210 may have look up tables that set forth a priority hierarchy for various types of communication signals. Each signal of this embodiment may include a header tag, which sets forth the nature of the signal, i.e. terrain data, etc. Thus, by knowing the type of signal that is being received and referring to the priority look up table, the data management controller 24 and ground control center controller 210 can determine the priority to be assigned to the various signals being processed.

In addition, a portion of the available bandwidth between the air vehicle 10 and the ground control center 14 is permanently dedicated to communication between the air vehicle 10 and the ground control center 14, as a command and control channel. By means of the command and control channel, the data management controller 24 and the ground control center controller 210 can continuously communicate with each other, such as by notifying each other of the priority and size of the file to be transferred so that the lower priority communication signals can be halted, if necessary to free up sufficient bandwidth for higher priority communication signals. In this way, the air vehicle 10, via the command and control channel, can notify the ground control center 14 that it has a high priority signal that it needs to transmit, even if the ground control center 14 is currently occupying virtually all of the available bandwidth in transmitting data to the air vehicle 10. Alternatively, the ground control center 14 can notify the data management controller 24 of the air vehicle 10 via the command and control channel that a high priority signal is to be transmitted. In either instance, the air vehicle 10 and the ground control center 14 can halt some or all of the lower priority transmissions in order to provide sufficient communication bandwidth to support the high priority air vehicle communication.

The priority hierarchy defines the types of communication signals and the relative importance or priority of the different types of communication signals. The priority hierarchy may be as simple as according a high priority to all signals transmitted between the ground control center and the air vehicle and a low priority to all passenger communications and in-flight entertainment. Alternatively, the priority hierarchy may be more detailed with each different type of communication signal having a different priority. For example, if the ground control center 14 advises the data management controller 24, via the command and control channel, that detailed terrain data having a certain file size is to be transmitted to the air vehicle 10, then the data management controller 24 may determine if sufficient bandwidth is available and, if not, may reduce or otherwise limit the communication bandwidth available for passenger communications and/or in-flight entertainment. Once the terrain data transmission is complete, the data management controller 24 may reallocate the communication bandwidth to restore sufficient communication bandwidth for passenger communications and in-flight entertainment. By assigning relative priorities to the different types of communications signals, the system and method of this aspect of the present invention can insure that sufficient communications bandwidth is available for the higher priority signals, even as the competition for the communications bandwidth increases.

Figure 3:
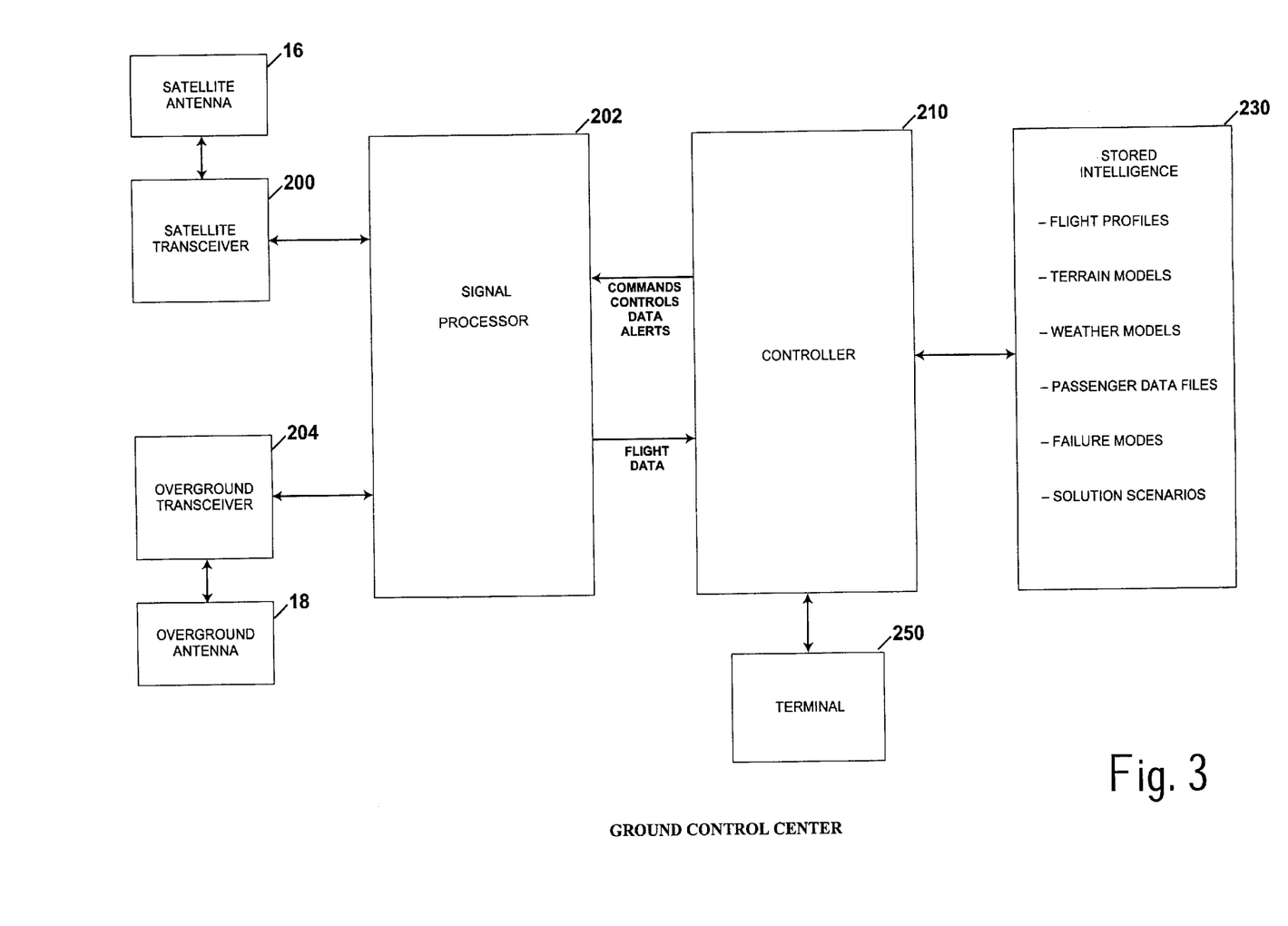
FIG. 3 is a block diagram of a portion of a ground control center that implements the methods and systems of the present invention according to one embodiment.

FIG. 3 is a block diagram that illustrates some of the components of the ground control center 14. The ground control center 14 has a satellite transceiver 200 to communicate with the satellite antenna 16. The ground control center 14 also contains an over ground transceiver 204 to communicate with the over ground antenna 18. The ground control center also includes a signal processor 202, typically embodied by a computer, to process the signals transmitted to and from the ground control center 14. The ground control center 14 also includes a system controller 210 for controlling the operation of the ground control center and directing the flow of data and other signals therethrough. For example, the signal processor 202 transmits the data received from air vehicle 10, such as the flight and other status data and the audio/video data, to the system controller 210. In addition, the signal processor 202 receives signals related to commands, controls, data and alerts from the system controller 210 and transmits those signals to the air vehicle via the satellite transceiver 200 and/or the overground transceiver 204. The ground control center also permits information to be entered and displayed via the terminal 250, such as by a pilot in the ground control center.

The system controller 210 also communicates with a stored intelligence unit 230, such as a database maintained by a server or the like, that contains a variety of flight-related information. For example, the stored intelligence unit 230 may contain preferred flight profiles and extensive terrain and weather data and models for the various flights monitored by the ground control center 14. Because the conventional terrain database onboard an air vehicle 10 provides relatively basic terrain data to the flight crew, it may be advantageous in certain situations for the system controller 210 to transmit detailed terrain data to the air vehicle 10. For example, if the anticipated flight path of the air vehicle has varied so that it will now pass in the vicinity of any notable terrain, such as a mountain range or the like, the ground control center may transmit the detailed terrain data to the air vehicle. Alternatively, the ground control center may stream the detailed terrain data to the air vehicle so that the flight crew onboard the air vehicle always has access to detailed terrain data for the upcoming terrain. The system controller 210 is also capable of receiving and storing weather data that is relevant to the air vehicle flights monitored by the ground control center 14. The weather models, based on timely and accurate weather data, enhances the ground control center's ability to identify weather patterns of concern and to alert and advise the air vehicles that may be affected by the weather pattern. Additionally, the ground control center may transmit the detailed weather data to the air vehicle for display so that the flight crew onboard the air vehicle has the most current information. As will be noted, the ground control center is therefore adapted to provide data that is at least as detailed and, typically, more detailed than the corresponding data previously stored onboard the air vehicle.

The stored intelligence unit 230 may also store optimum flight profiles for the various air vehicles monitored by the ground control center. By comparing the current flight profile of an air vehicle, as determined from the flight data provided by the air vehicle, to the respective optimum flight profile, the ground control center can advise the flight crew of corrective actions to be taken to return to the optimum flight path. Alternatively, the ground control center may engage the auto-pilot or turn over control of the air vehicle to a pilot in the ground control center to return the air vehicle to the optimum flight path, as described below.

The stored intelligence unit 230 may also store data defining or otherwise identifying a number of different failure modes, such as actual data from previous air vehicle incidents, failure modes identified from hypothetical scenarios, or simulator-generated failure modes. By analyzing the flight data received from the air vehicle, the ground control center can identify the onset of a failure mode and can alert the flight crew onboard the air vehicle 10, such as by an audible or visual warning to the flight crew. The ground control center can also include a plurality of solution scenarios defining the manner in which various failure modes may be resolved. The solution scenarios may be based, for example, upon past experience and stored in the stored intelligence unit 230. Alternatively, the solution scenarios may be developed by simulation based upon the actual flight conditions, typically once a failure mode has been identified. With respect to the solution scenarios based upon simulation, personnel on the ground may have access to a flight simulator so as to reproduce the exact situation of the air vehicle and to quickly determine the corrections to be made to remedy the situation. Thus, in addition or instead of merely transmitting an indication to the flight crew advising of the possible onset of a failure mode, the ground control center 14 may transmit a solution scenario defining the preferred manner by which the failure mode may be resolved. The solution scenario may be presented to the flight crew via displays 32, which indicate the desired "fly to" positions to implement the solution scenario via display bugs 120 or indicate a desired "path in space" display via a heads up display (HUD) 130. Alternatively, the solution scenario may be imposed on the air vehicle controls by the ground control center 14, such that the ground control center 14 overrides the flight crew inputs.

In addition, the stored intelligence unit 230 may include passenger profile information and security information, such as a library of known "persons of interest." Alternatively, the ground control center 14 may have a link to a security database in another location. In either embodiment, the passenger profile information may include images and other data relating to various individuals who are known to pose a risk to airline safety. Thus, based on the data received from the air vehicle 10, such as the video data captured in the cabin, and the extensive information contained in the stored intelligence unit 230, the ground control center may identify passengers onboard the air vehicle who match the image or profile of individuals known to pose a security risk. The ground control center then may issue a wide variety of data, alerts, commands and assistance to the flight crew of the air vehicle to advise them of the situation and the recommended course of action.

The communications between the ground control center 14 and the air vehicle 10 are designed to maintain the safety and increase the efficiency of the flight. As such, these communications are assigned a high priority and accorded at least a portion of the communications bandwidth, sometimes to the exclusion of passenger communications in the event of contention for the communications bandwidth. In addition to providing information to assist the flight crew onboard the air vehicle, control for part or all of the remainder of the flight may be taken away from the flight crew onboard the air vehicle, such as in instances in which the flight crew onboard the air vehicle is prevented from or otherwise unable to execute the desired flight plan. In this situation, the ground control center 14 may assume control of part or all of the flight or the auto-pilot may be engaged, either by a person onboard the air vehicle 10 or in the ground control center 14.

When a person onboard the air vehicle 10 or in the ground control center 14 engages the auto-pilot system 60, an appropriate signal is sent to the data management controller 24. The data management controller 24 then instructs the auto-pilot system 60 to engage. Once engaged, the auto-pilot system 60 assumes control of the flight and thereafter the landing of the air vehicle 10 without requiring further input from any person onboard the air vehicle 10. In particular, no input is required from any person onboard the air vehicle 10 to extend the flaps, slats and landing gear of the air vehicle 10, unlike a conventional auto-pilot system which generally requires manual input to transition from flight to landing. As such, the air vehicle preferably includes an automated drive mechanism for controlling the flaps and slats and for extending the landing gear in response from commands issued by the auto-pilot system. While the auto-pilot system 60 is engaged, the "active" status of the auto-pilot mode is generally displayed in the air vehicle 10 on the ground station display 140, as described in detail hereinbelow.

The auto-pilot system 60 may be irrevocably engaged, either from the ground control center 14 or from onboard the air vehicle 10, such that it is impossible for any person onboard the air vehicle 10 to resume manual operation of the air vehicle 10. Alternatively, a person or limited group of people, such as members of the flight crew, may have access to a code that, when entered in the air vehicle 10, disengages the auto-pilot system 60 and allows manual control of the air vehicle 10 to resume. The ability to engage the auto-pilot mode from the air vehicle 10 or the ground control center and to prevent others from easily disengaging the auto-pilot mode, if at all, precludes anyone other than the flight or ground crew from taking over control of the air vehicle. As an alternative to engaging the auto-pilot mode, the ground control center personnel may assume control of the flight and landing of the air vehicle via a series of commands issued from the terminal 250. In this situation, ground control personnel that are trained to fly and land air vehicles may assume control of the flight and may issue flight commands from the ground control center. Thus, if the analysis performed at the ground control center 14 indicates that manual control of the air vehicle is not adequate for some reason, such as instances in which the security onboard the vehicle is threatened, the flight crew is incapacitated or requires ground assistance to manage a unique situation, and/or the air vehicle 10 is not headed in the correct direction or is exhibiting other significant flight anomalies, the ground control center personnel may engage the auto-pilot mode of the air vehicle 10 or take over control of the air vehicle to preclude anyone else from controlling the flight, thereby providing additional flight security and safety.

Figure 4:
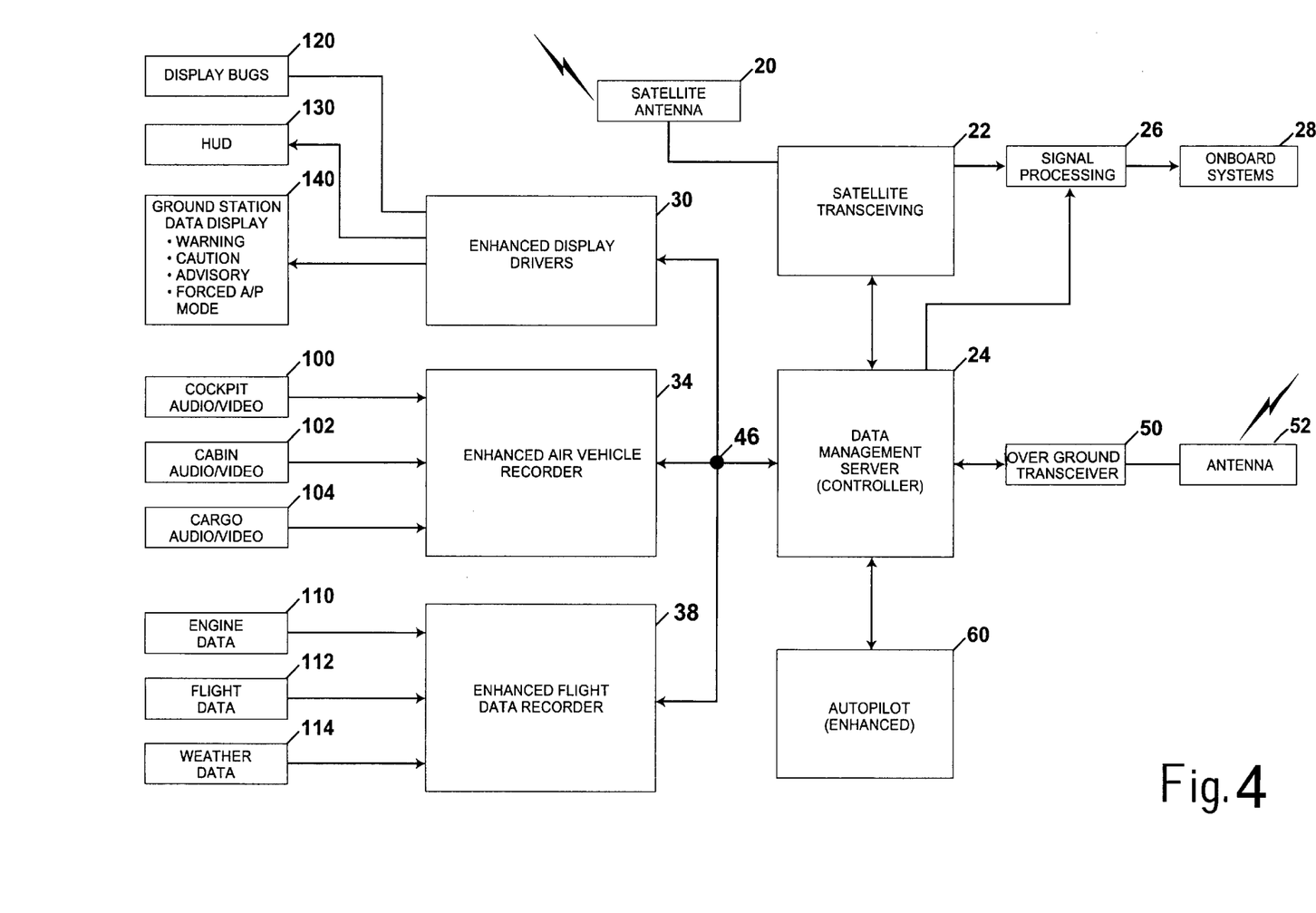
FIG. 4 is a block diagram of a portion of an air vehicle that implements the methods and systems of the present invention according to one embodiment.

FIG. 4 is a more detailed illustration of various systems onboard the air vehicle 10 that indicates, among other things, the manner in which data is captured and displayed or otherwise transmitted. The data management system communicates with display drivers 30 which control the various displays, including the heads up display (HUD) 130 and a ground station display 140 that depicts the information transmitted to the air vehicle from the ground control center. Thus, when the data management controller 24 receives signals from the ground control center 14 via satellite and/or over ground communication, the data management controller 24 may, in turn, issue signals to the display drivers 30 via the bus 46 such that the enhanced display drivers 30 then transmit appropriate signals to the displays 32 in order to appropriately advise the flight crew.

One type of display that is driven by the display drivers 30 is the depiction of display bugs 120 upon a variety of displays onboard the air vehicle. The display bugs indicate the target settings for various parameters that are displayed on standard air vehicle instrumentation displays. Typically, the system controller 210 in the ground control center 14 generates the signals defining the target settings by monitoring flight data from the air vehicle 10 in comparison to preferred flight profiles and the like stored in the stored intelligence unit 230. The system controller 210 then transmits the target settings to the air vehicle 10 for display on the appropriate instrumentation. As such, the display drivers 30 issue signals to the various displays to depict an icon or other indication upon the respective displays that define the target setting. The flight crew utilizes the target settings to adjust the current settings of the vehicle controls in such a way as to realize the target settings and obtain the desired flight performance.

Another type of display that may be driven by the enhanced display drivers 30 is the HUD 130. The HUD 130 may depict detailed terrain, weather or other data provided by the ground control center to give the flight crew a comprehensive visual representation along the flight path. In addition, the HUD 130 may depict modified flight paths transmitted from the ground control center 14. As described above, the data transmitted from the ground control center is oftentimes quite detailed and, in fact, may be far more detailed than the corresponding data stored onboard the air vehicle, such that the HUD 130 can render a detailed image to the flight crew of the path ahead and also of a desired flight path in space. As a result of the control of the communications bandwidth provided by the system and method of the present invention, however, sufficient communications bandwidth may be obtained for transmitting the detailed data, perhaps to the exclusion of passenger communications or other lower priority signals.

A further type of display is a ground station data display 140, which may be a new display onboard the air vehicle 10 or a new option or page supported by an existing display onboard the air vehicle 10. For example, the ground station data display 140 may be supported by the existing center display unit (CDU) of the air vehicle 10. The ground station data display 140 represents inputs from the ground control center 14 to inform the flight crew of concerns related to the flight. The inputs may provide warning, caution or advisory information to display for the flight crew, depending on the level of the concern and various alternatives for resolving the issue. In addition, the inputs may include a notification for the flight crew that the auto-pilot is engaged, as discussed more fully hereinabove. Other types of displays 32 onboard the air vehicle also may be driven by the display drivers 30 to depict other types of information, such as remedial measures, provided by the ground control center 14, if so desired.

As also shown in FIG. 4, the air vehicle recorder 34 is capable of receiving and processing audio and/or video data 36 from sensors located throughout the air vehicle 10. For example, audio and video sensors may transmit data to the air vehicle recorder 34 from the cockpit 100, the cabin 102, the cargo/baggage area 104 of the air vehicle and the like. The air vehicle recorder 34 transmits the audio and/or video data 36 to the data management controller 24 where the data 36 may then be transmitted to the ground control center 14 by satellite and/or over ground communication. The audio and/or video data 36 are monitored, examined and stored in the ground control center 14. Because the air vehicle recorder 34 does not have to store the audio and/or video data 36, the amount of audio and/or video data 36 that can be monitored is not limited.

The ground control center 14 may monitor the audio and/or video data 36 from the air vehicle 10 for any unusual activity and may alert the flight crew of the activity and advise the flight crew of the proper security procedures, if necessary. To provide additional security to the air vehicle 10, the system controller 210 may examine the data 36 by comparing the images of the passengers to security information containing a library of known "persons of interest." If the system controller 210 identifies a match, the ground control center 14 may notify the flight crew onboard the air vehicle of appropriate security procedures. For example, personnel in the ground control center may notify the law enforcement if a passenger is identified as "wanted" and warn the flight crew or instruct the flight crew to land the air vehicle immediately. The system controller 210 also may instruct the data management controller 24 to display the security procedures on the ground station data display 140 or the like.

Further, the air vehicle may include a flight data recorder 38. As described above and as depicted in FIG. 4, the flight data recorder receives status data 40 from various air vehicle sensors. The status data 40 may include many types of engine data 110 from engine sensors, flight data 112 from flight sensors, and weather data 114 from weather sensors, for instance. The flight data recorder 38 transmits the status data 40 to the data management controller 24 where at least some of the status data 40 is transmitted to the ground control center 14 by satellite and/or over ground communication. The ground control center 14 may then monitor, analyze and store the status data 40 to determine if the air vehicle 10 requires any assistance from the ground control center 24, as discussed in more detail hereinabove.

By controlling the communications bandwidth between the air vehicle 10 and the ground control center 14, higher priority signals, such as the signals relating to flight safety, will not be blocked or delayed by lower priority signals, such as passenger communications or in-flight entertainment. Thus, the system and method of the present invention could maintain or improve the safety and efficiency of flights, even as the competition for the communications bandwidth increases by insuring that those signals relating to flight safety are accorded sufficient bandwidth.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of selectively allocating communication bandwidth supported by an air vehicle, the method comprising:

providing a priority hierarchy for different types of communication signals based on a relative importance of the different types of communication signals;

monitoring the types of communication signals to be transmitted to and from the air vehicle; and dedicating portions of the communication bandwidth to predefined types of the communication signals based on the priority hierarchy.

2. The method of claim 1, further comprising permanently dedicating a portion of the communication bandwidth for communications between the air vehicle and a ground control center.

3. The method of claim 1, further comprising reading a header associated with a respective communication signal to determine the type of communication signal and determining the portion of communication bandwidth to dedicate to the communication signal based upon the relative importance of the type of communication signal as defined by the priority hierarchy.

4. The method of claim 1, further comprising storing the priority hierarchy in a data management system of the air vehicle.

5. The method of claim 1, wherein dedicating portions of the communication bandwidth comprises limiting the portion of the communication bandwidth available to types of communication signals having a low priority if communication signals having a higher priority are to be transmitted.

6. The method of claim 1, wherein dedicating portions of the communication bandwidth comprises reallocating the communication bandwidth as different types of communication signals are to be transmitted.

7. The method of claim 1, wherein providing the priority hierarchy comprises assigning higher priority to communications between a ground control center and the air vehicle and assigning a lower priority to passenger communication.

8. A system for selectively allocating the communication bandwidth supported by an air vehicle, the system comprising:

a communication system onboard the air vehicle and capable of transmitting and receiving different types of communication signals; and a processing element responsive to a priority hierarchy established for the different types of communication signals based on the relative importance of the different types of communication signals, said processing element capable of monitoring the types of communication signals to be transmitted via the communication system, and said processing element also capable of dedicating portions of the communication bandwidth to predefined types of the communication signals based on the priority hierarchy.

9. The system of claim 8, further comprising a memory device for storing the priority hierarchy.

10. The system of claim 8, wherein said processing element is further capable of permanently dedicating a portion of the communication bandwidth for communications between the air vehicle and a ground control center.

11. The system of claim 8, wherein said processing element is further capable of reading a header associated with a respective communication signal to determine the type of communication signal and determining the portion of the communication bandwidth to dedicate to the communication signal based upon the relative importance of the type of communication signal as defined by the priority hierarchy.

12. The system of claim 8, wherein said processing element is further capable of excluding types of communication signals having a low priority if communication signals having a higher priority are to be transmitted.

13. The system of claim 8, wherein said processing element is further capable of reallocating the communication bandwidth as different types of signals are to be transmitted.

* * * * *